United States Patent
Ofuji et al.

(10) Patent No.: US 8,345,636 B2
(45) Date of Patent: Jan. 1, 2013

(54) BASE STATION, MOBILE STATION, AND PROPAGATION PATH MEASURING SIGNAL TRANSMISSION CONTROL METHOD

(75) Inventors: Yoshiaki Ofuji, Yokohama (JP); Kenichi Higuchi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 127 days.

(21) Appl. No.: 12/293,511

(22) PCT Filed: Mar. 19, 2007

(86) PCT No.: PCT/JP2007/055576
§ 371 (c)(1),
(2), (4) Date: Nov. 17, 2008

(87) PCT Pub. No.: WO2007/111186
PCT Pub. Date: Oct. 4, 2007

(65) Prior Publication Data
US 2009/0225666 A1  Sep. 10, 2009

(30) Foreign Application Priority Data
Mar. 20, 2006  (JP) .................... 2006-077816

(51) Int. Cl.
*H04L 12/14* (2006.01)

(52) U.S. Cl. .................................... 370/332

(58) Field of Classification Search ............ 370/330, 370/332
See application file for complete search history.

(56) References Cited

U.S. PATENT DOCUMENTS

| | | | |
|---|---|---|---|
| 2004/0203465 A1* | 10/2004 | Goldstein et al. | 455/67.13 |
| 2005/0201474 A1 | 9/2005 | Cho et al. | |
| 2006/0221894 A1* | 10/2006 | Casaccia et al. | 370/328 |
| 2007/0097920 A1* | 5/2007 | Chen et al. | 370/331 |
| 2007/0104174 A1* | 5/2007 | Nystrom et al. | 370/343 |
| 2007/0253386 A1* | 11/2007 | Li et al. | 370/338 |
| 2008/0253389 A1* | 10/2008 | Larsson | 370/441 |

FOREIGN PATENT DOCUMENTS

| | | |
|---|---|---|
| JP | 2001-320346 A | 11/2001 |
| JP | 2002-125260 A | 4/2002 |
| JP | 2004-080333 A | 3/2004 |
| JP | 2004-297756 A | 10/2004 |
| JP | 2005-005781 A | 1/2005 |

(Continued)

OTHER PUBLICATIONS

International Search Report w/translation from PCT/JP2007/055576 dated Jun. 26, 2007 (5 pages).

(Continued)

*Primary Examiner* — Mark Rinehart
*Assistant Examiner* — Matthew Hopkins
(74) *Attorney, Agent, or Firm* — Osha Liang LLP (57) ABSTRACT

A base station includes a transmission method determining portion that determines whether to allow a mobile station to transmit a propagation path measuring signal by one of a multi-carrier method and a single carrier method; and a transmission method sending portion that sends information indicating the determined transmission method with the mobile station. A mobile station includes a data mapping portion that maps a signal sequence of a propagation path state measuring signal in accordance with transmission information that a base station sends in order to indicate the propagation path state measuring signal is transmitted by either one of a single carrier method and a multi-carrier method.

13 Claims, 5 Drawing Sheets

FOREIGN PATENT DOCUMENTS

| | | |
|---|---|---|
| JP | 2005-020599 A | 1/2005 |
| JP | 2005-163913 A | 6/2005 |
| JP | 2005-241899 A | 9/2005 |
| JP | 2005-317567 A | 11/2005 |
| TW | I235008 | 6/2005 |
| TW | I245523 | 12/2005 |
| WO | 03/005652 A1 | 1/2003 |
| WO | 03/005740 A2 | 1/2003 |
| WO | 03/028329 A2 | 4/2003 |

OTHER PUBLICATIONS

Written Opinion from PCT/JP2007/055576 dated Jun. 26, 2007 (3 pages).

Taiwanese Office Action for Application No. 96109536, mailed on Apr. 30, 2010 (5 pages).

English Abstract for Taiwanese Publication No. I245523, (1 page).

English Abstract for Taiwanese Publication No. I235008, (1 page).

Japanese Office Action for Application No. 2006-077816, mailed on Feb. 14, 2012 (4 pages).

Patent Abstracts of Japan for Japanese Publication No. 2005-163913, publication date Jun. 23, 2005 (1 page).

Patent Abstracts of Japan for Japanese Publication No. 2001-320346, publication date Nov. 16, 2001 (1 page).

Japanese Office Action for Application No. 2006-077816, mailed on Jun. 5, 2012 (5 pages).

Patent Abstracts of Japan for Japanese Publication No. 2002-125260, publication date Apr. 26, 2002 (1 page).

Patent Abstracts of Japan for Japanese Publication No. 2005-005781, publication date Jan. 6, 2005 (1 page).

* cited by examiner

BASE STATION, MOBILE STATION, AND PROPAGATION PATH MEASURING SIGNAL TRANSMISSION CONTROL METHOD

TECHNICAL FIELD

The present invention relates to a base station, a mobile station, and a transmission control method of a propagation path measuring signal.

BACKGROUND ART

A fourth generation (4G) mobile communications method, which is the next generation mobile communications method of International Mobile Telecommunication 2000 (IMT-2000), has been under development.

The 4G mobile communications method is expected to flexibly support a multi-cell environment including a cellular system, and an isolated cell environment such as a hot spot area and an indoor environment, and increase frequency utilization efficiencies in both cell environments.

Regarding a link from a mobile station to a base station (referred to as an uplink, below) in the 4G mobile communications method, the following radio access methods have been proposed. As a single carrier transmission method, a Direct Sequence Code Division Multiple Access (DS-CDMA) method, an Interleaved Frequency Division Multiple Access (IFDMA) method, and a Variable Spreading and Chip Repetition Factors-CDMA (VSCRF-CDMA) method are proposed, for example (see Japanese Patent Application Laid-Open Publication No. 2004-297756, for example).

As a multi-carrier transmission method, an Orthogonal Frequency Division Multiplexing (OFDM) method, a Spread OFDM method, a Multi-Carrier Code Division Multiple Access (MC-CDMA) method, and a Variable Spreading Factor Spread OFDM (VSF-Spread OFDM) method are proposed, for example.

The single carrier methods can reduce power back-off of a transmission power amplifier, which leads to better energy efficiency because peak power is low, as far as power consumption in a mobile station is concerned.

In addition, from a viewpoint of transmission power limitations in a user terminal device, the single carrier transmission methods, which may have a low peak-to-average power ratio (PAPR) and high transmission amplifier efficiency, are suitable. In addition, coverage can be increased by applying the single carrier transmission because a transmission signal can reach farther away.

On the other hand, the user terminal device is required to transmit a wideband propagation path state measuring signal in order to transmit data using a band that can provide a better reception state in a frequency scheduling method that utilizes propagation path variations caused by frequency selective fading in the frequency domain.

SUMMARY OF INVENTION

Problem to be Solved by the Invention

However, the background art has the following problem.

When the propagation path state measuring signal is transmitted in a wide band, there may be a problem in that measurement accuracy of the propagation path state is degraded in the base station because of reduced transmission power density per band, which corresponds to reception signal power density in the base station.

The present invention has been made in view of the above problem, and is directed to a base station, a mobile station, and a transmission control method of a propagation path measurement signal that are capable of improving the measurement accuracy of the propagation path state.

Means for Solving the Problem

In order to achieve the above, a base station according to an embodiment of the present invention includes a transmission method determining portion that determines whether to allow a mobile station to transmit a propagation path measuring signal by one of a multi-carrier method and a single carrier method; and a transmission method sending portion that sends information indicating the determined transmission method with the mobile station.

With such a configuration, a mobile station is allowed to transmit the propagation path state measuring signal at intervals in the frequency domain by the multi-carrier method. In addition, a reception channel state in a wide range of the frequency domain can be measured without increasing a total transmission bandwidth of the transmission path state measuring signal, namely, without decreasing electric power density.

In addition, a mobile station according to another embodiment of the present invention includes a data mapping portion that maps a signal sequence of a propagation path state measuring signal in sub-carriers in accordance with transmission information sent from a base station, the transmission information indicating that the propagation path state measuring signal is transmitted by either of a single carrier method and a multi-carrier method.

With such a configuration, the transmission path state measuring signal can be transmitted at intervals in the frequency domain by the multi-carrier method.

A transmission control method of a transmission path measuring signal, according to another embodiment of the present invention, includes a transmission method determination step, wherein a base station determines one of a multi-carrier method and a single carrier method by which a mobile station is allowed to transmit a transmission path measuring signal; a transmission method sending step, wherein the base station sends information indicating the determined transmission method with the mobile station; a data mapping step, wherein the base station maps a signal sequence of the transmission path measuring signal in sub-carriers in accordance with the information indicating one of the multi-carrier method and the single carrier method by which the mobile station transmits the transmission path measuring signal, the information having been sent by the base station; and a transmission path measuring signal transmission step, wherein the mobile station transmits the transmission path measuring signal.

With such a configuration, the base station may allow the mobile station to transmit the propagation path state measuring signal at intervals in the frequency domain by the multi-carrier method. In addition, a reception channel state in a wide range of the frequency domain can be measured without increasing the total transmission bandwidth of the transmission path state measuring signal, namely, without decreasing electric power density.

Advantage of the Invention

According to an example of the present invention, a base station, a mobile station, and a transmission control method

LIST OF REFERENCE SYMBOLS 10 transmission apparatus
20 reception apparatus

BEST MODE FOR CARRYING OUT THE INVENTION

Referring to the accompanying drawings, an example of the present invention will be described in the following.

In all the drawings for describing the example, the same reference marks are given to components having the same functions, and repetitive explanation is omitted.

A radio communications system according to an example of the present invention is described.

A radio communications system according to the example of the present invention includes a base station 100 and a mobile station 200.

Figure 1:
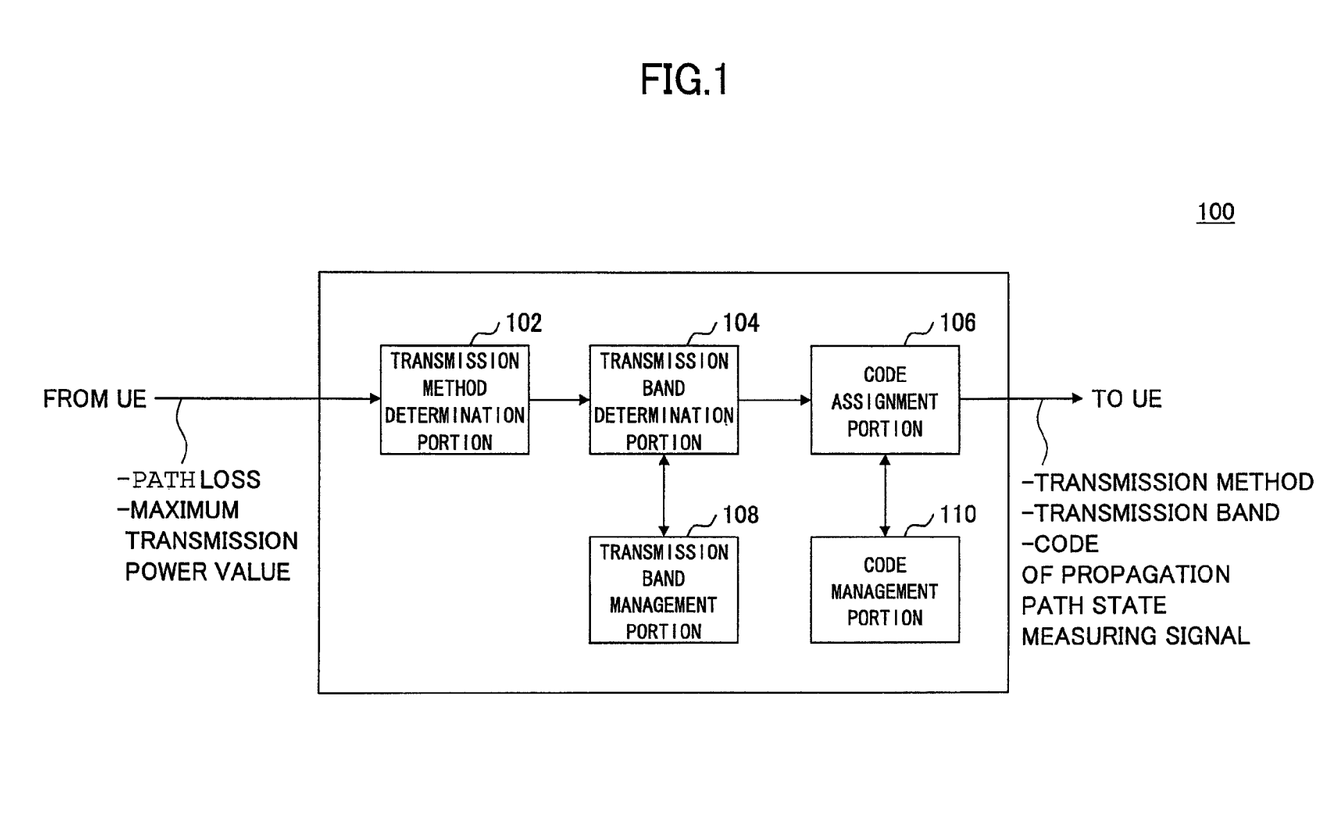
FIG. 1 is a partial block diagram illustrating a transmission apparatus according to an example of the present invention.

Next, the base station 100 according to this example is explained in reference to FIG. 1.

The base station 100 is provided with a transmission apparatus that includes a transmission method determination portion 102 that inputs a path loss and a maximum transmission power value that are provided from the mobile station 200, a transmission band determination portion 104 that inputs an output signal of the transmission method determination portion 102, a transmission band management portion 108 connected to the transmission band determination portion 104, a code assignment portion 106 serving as a transmission method provider that inputs an output signal of the transmission band determination portion 104, and a code management portion 110 connected to the code assignment portion 106.

The transmission method determination portion 102 determines a transmission method for transmitting a propagation path state measuring signal to be transmitted by the mobile station 200. For example, the transmission method determination portion 102 determines whether each user transmits the propagation path state measuring signal by the single carrier transmission method or by the multi-carrier transmission method.

For example, the transmission method determination portion 102 determines to allow a user existing near the base station 100 to transmit the propagation path state measuring signal by the multi-carrier transmission method. Alternatively, the transmission method determination portion 102 determines to allow users except for the user existing near the base station 100 to transmit the propagation path state measuring signal by the single carrier transmission method.

For example, the transmission method determination portion 102 determines whether the propagation path state measuring signal should be transmitted by the multi-carrier method or the single carrier method in accordance with the path loss and the maximum transmission power value provided from the mobile station 200.

When the mobile station 200 transmits the propagation path state measuring signal with a wide band, the transmission power per unit band is reduced. Therefore, a reception level of the propagation path state measuring signal received by the base station 100 is reduced, which leads to decreased measurement accuracy. In this case, when the base station 100 selects the mobile station 200 whose propagation path state measuring signal is not decreased, the mobile stations that can use the wide band are limited.

Consequently, the mobile station 200 that transmits by the multi-carrier method and the mobile station 200 that transmits by the single carrier method are dealt with by Frequency Division Multiplexing (FDM) in this example.

In this case, the mobile stations 200 that transmit by the multi-carrier method may be dealt with by Code Division Multiple Access (CDMA). In addition, the mobile stations 200 that transmit by the multi-carrier method may be dealt with by Frequency Division Multiple Access (FDMA).

Moreover, the mobile stations 200 that transmit by the single carrier method may be dealt with by Frequency Division Multiple Access (FDMA) and Code Division Multiple Access (CDMA).

Additionally, the mobile station 200 that transmits by the multi-carrier method and the mobile station 200 that transmits by the single carrier method are dealt with by IFDMA.

In this case, the mobile stations 200 that transmit by the multi-carrier method may be dealt with by Frequency Division Multiple Access (FDMA) and Code Division Multiple Access (CDMA).

The mobile stations 200 that transmit by the single carrier method may be dealt with by Frequency Division Multiple Access (FDMA) and Code Division Multiple Access (CDMA).

With this, the base station 100 can measure the reception channel state in a wide range in the frequency domain without widening a total transmission bandwidth of the propagation path state measuring signal, e.g., without reducing the power density.

For example, the user terminal device having a sufficient transmission power margin may be allowed to transmit the propagation path state measuring signal at intervals in the frequency domain by the multi-carrier method. In this case, the transmission method determination portion 102 estimates in accordance with the provided path loss the transmission power that can realize a reception quality specified in advance, and determines to allow the mobile station having a difference greater than or equal to a predetermined threshold, the difference being between the maximum transmission power and the estimated transmission power, to transmit the propagation path state measuring signal.

The transmission band determination portion 104 determines the transmission band to be used to transmit the propagation path state measuring signal.

For example, the transmission band determination portion 104 assigns discontinuous bands rather than continuous bands along a frequency axis to the mobile station 200 that is allowed by the transmission method determination portion 102 to transmit the propagation path state measuring signal by the multi-carrier transmission method. In addition, the transmission band determination portion 104 assigns continuous narrow bands to the mobile station 200 that is allowed by the transmission method determination portion 102 to transmit the propagation path state measuring signal by the single carrier transmission method.

Figure 2:
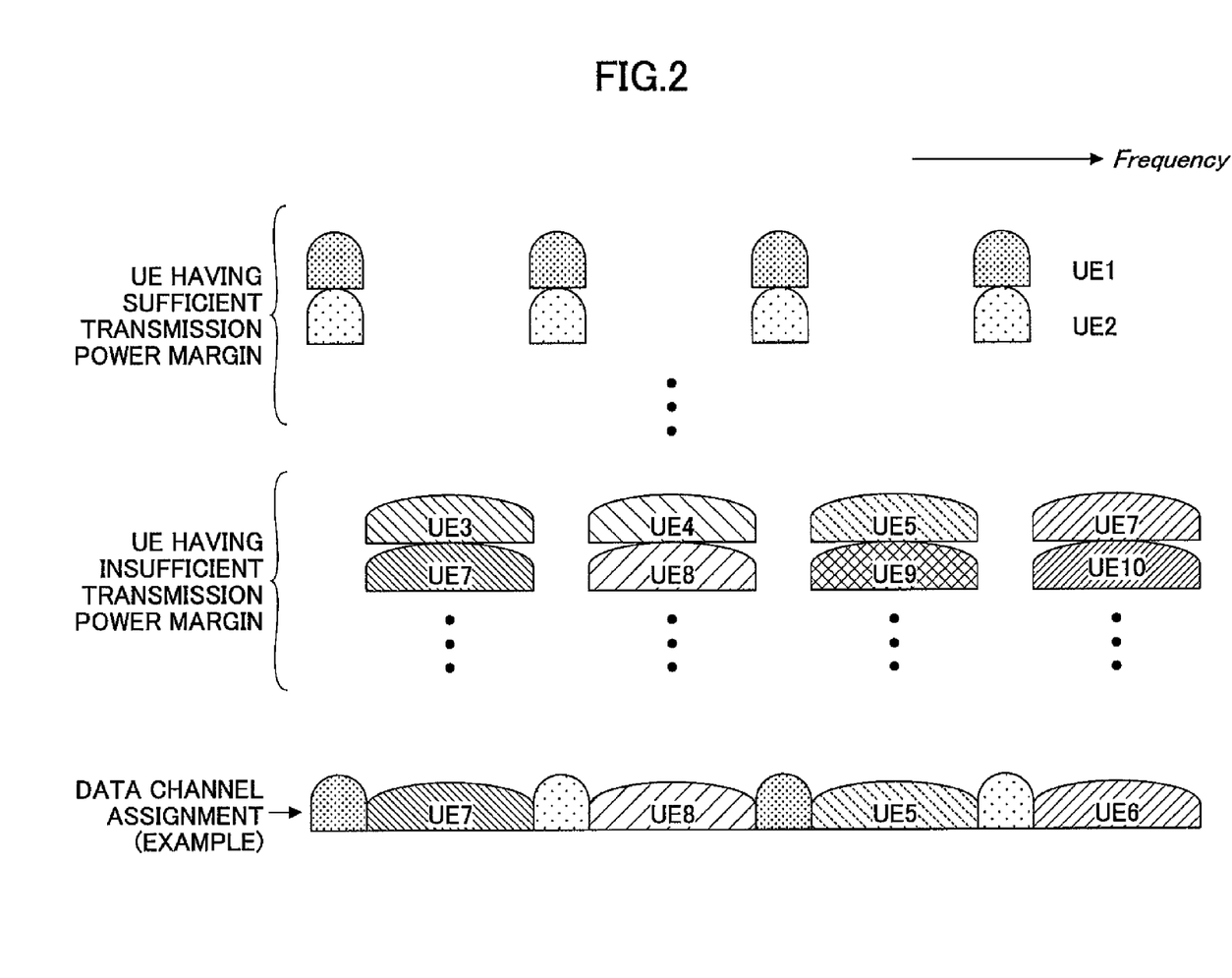
FIG. 2 is an explanatory view illustrating assignment of a transmission band for a propagation path measuring signal according to an example of the present invention.

For example, in the case of a system where the mobile station transmitting by the multi-carrier method and the mobile station transmitting by the single carrier method are dealt with by Frequency Division Multiplexing, the transmission band determination portion 104 assigns plural discontinuous frequency blocks among frequency blocks into which a system bandwidth is divided so that the frequency blocks are composed of continuous frequency sub-carriers when the transmission is determined to be made by the multi-carrier method (UE having a sufficient transmission power margin), and assigns one or more of the frequency blocks continuous in the frequency domain when the transmission is determined to be made by the single carrier method (UE having an insufficient transmission power margin), as shown in FIG. 2.

The mobile station 200 transmits the propagation path state measuring signal by using the assigned band. The base station 100 carries out scheduling in accordance with the reception state of the propagation path state measuring signal, and assigns a band for use in transmitting a data channel within a range of the bands used to transmit the propagation path state measuring signal by each mobile station.

Figure 3:
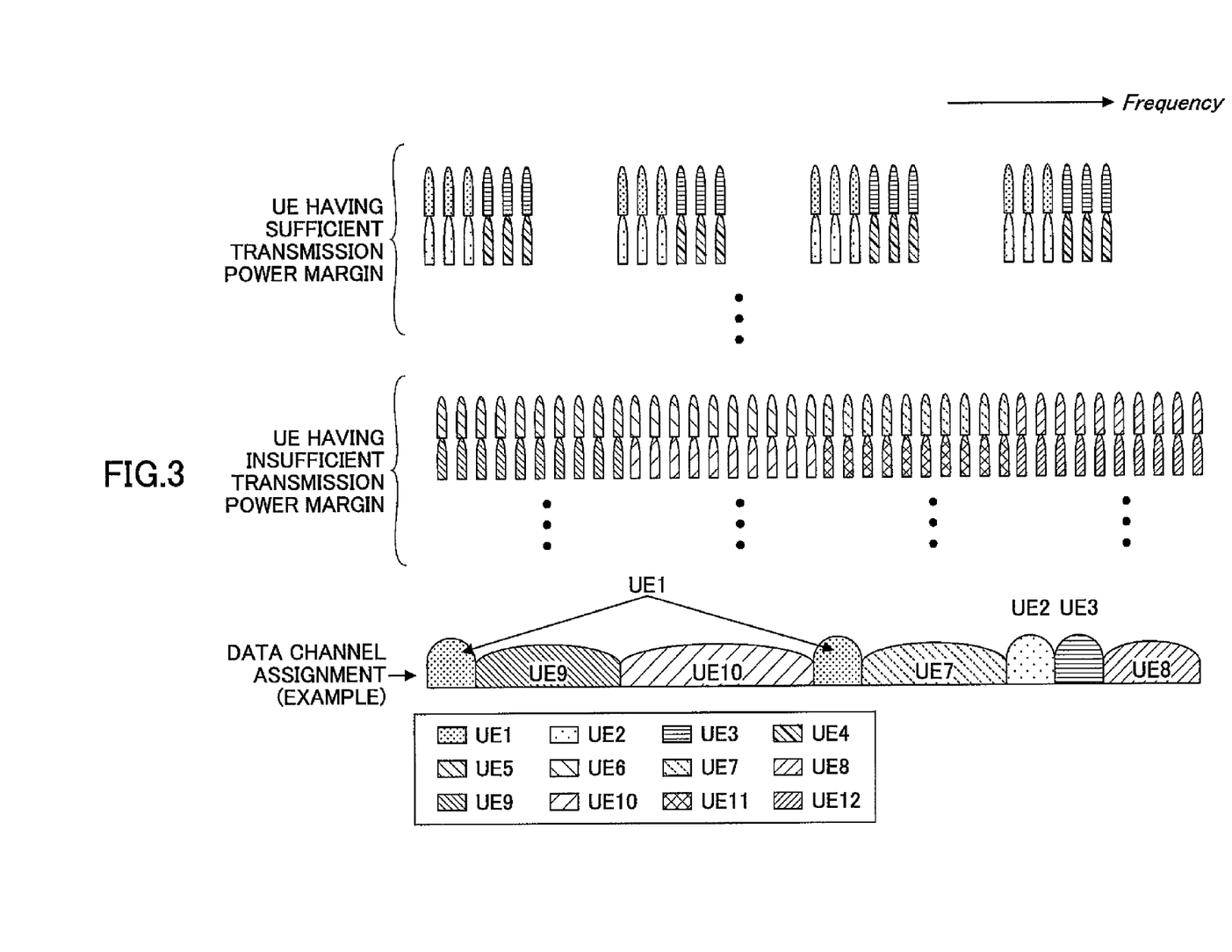
FIG. 3 is an explanatory view illustrating assignment of a transmission band for a propagation path measuring signal according to an example of the present invention.

In addition, in the case of a system where the mobile station transmitting by the multi-carrier method and the mobile station transmitting by the single carrier method are dealt with by IFDMA, for example, the transmission band determination portion 104 assigns plural discontinuous distribution type frequency blocks among distribution type frequency blocks composed of discretely distributed frequency sub-carriers in the system bandwidth when the transmission is determined to be made by the multi-carrier method (UE having a sufficient transmission power margin), and assigns one or more of the continuous distribution type frequency blocks when the transmission is determined to be made by the single carrier method (UE having an insufficient transmission power margin), as shown in FIG. 3.

The mobile station 200 transmits the propagation path state measuring signal by using the assigned band. The base station 100 carries out scheduling in accordance with the reception state of the propagation path state measuring signal, and assigns the band for use in transmitting the data channel within a range of the bands used to transmit the propagation path state measuring signal by each mobile station.

The transmission band management portion 108 manages an assignment situation of the frequency band assigned by the transmission band determination portion 104. Namely, the transmission band management portion 108 manages a usage situation of the current band used by a user and which band is used by which user.

The code assignment portion 106 determines a code for the propagation path state measuring signal. For example, the code assignment portion 106 assigns the codes to the corresponding mobile stations that transmit the propagation path state measuring signal so that the mobile stations are orthogonal with one another along the frequency axis. In addition, the code assignment portion 106 provides the transmission method of the propagation path state measuring signal, the transmission band, and the code with the mobile station 200.

The code management portion 110 manages an assignment situation of the code for the propagation path state measuring signal. Namely, the code management portion 110 manages a usage situation of the code.

Figure 4:
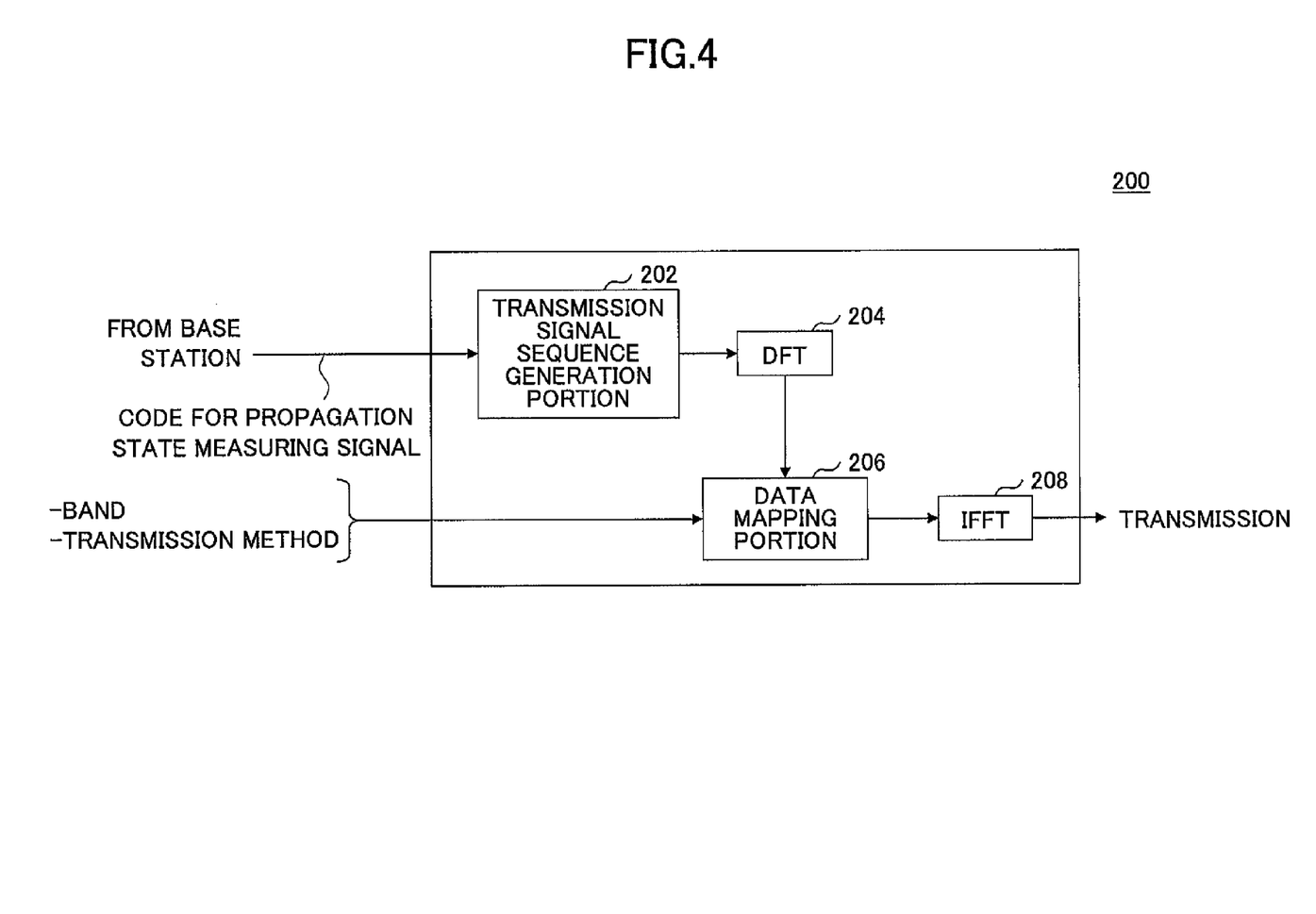
FIG. 4 is a partial block diagram illustrating a reception apparatus according to an example of the present invention.

Next, the mobile station 200 according to this example of the present invention is explained in reference to FIG. 4.

The mobile station 200 is provided with a reception apparatus that includes a transmission signal sequence generation portion 202 that inputs information indicating the code for the propagation path state measuring signal provided from the base station 100, a Discrete Fourier Transformation (DFT) portion 204 that inputs an output signal of the transmission signal sequence generation portion 202, a data mapping portion 206 that inputs information indicating the transmission method and information indicating the band, both pieces of the information being provided from the base station 100, and an Inverse Fast Fourier Transform (IFFT) portion 208 that inputs an output signal of the data mapping portion 206.

The transmission signal sequence generation portion 202 generates a signal sequence of the propagation path state measuring signal in accordance with the provided code and outputs the signal sequence to the DFT portion 204.

The DFT portion 204 carries out the Discrete Fourier Transformation for the input signal sequence of the propagation path state measuring signal, generates a signal sequence, and outputs the signal sequence to the data mapping portion 206. For example, the DFT portion 204 transforms a time domain waveform into a frequency domain waveform.

The data mapping portion 206 maps the input signal sequence in the sub-carriers in accordance with the provided transmission method and transmission band, and outputs the mapped signal sequence to the IFFT portion 208.

For example, in the case of the system where the mobile station transmitting by the multi-carrier method and the mobile station transmitting by the single carrier method are dealt with by Frequency Division Multiplexing, the data mapping portion 206 maps the signal sequence of the propagation path state measuring signal to plural discontinuous frequency blocks among frequency blocks obtained by dividing a system bandwidth into blocks of frequency sub-carriers when the transmission is determined to be made by the multi-carrier method, and maps the signal sequence of the propagation path state measuring signal to frequency blocks that are continuous frequency carrier blocks into which the system bandwidth is divided when the transmission is determined to be made by the single carrier method.

In addition, in the case of the system where the mobile station transmitting by the multi-carrier method and the mobile station transmitting by the single carrier method are dealt with by IFDMA, for example, the data mapping portion 206 maps the signal sequence of the propagation path state measuring signal to plural discontinuous distribution type frequency blocks among distribution type frequency blocks composed of frequency sub-carriers discretely distributed in the system bandwidth when the transmission is determined to be made by the multi-carrier method, and maps the signal sequence of the propagation path state measuring signal to the distribution type frequency blocks composed of frequency sub-carriers discretely distributed in the system bandwidth when the transmission is determined to be made by the single carrier method.

The IFFT portion 208 carries out the Inverse Fourier Transformation for the signal sequence mapped in the sub-carriers, and transmits the transformed signal sequence.

Figure 5:
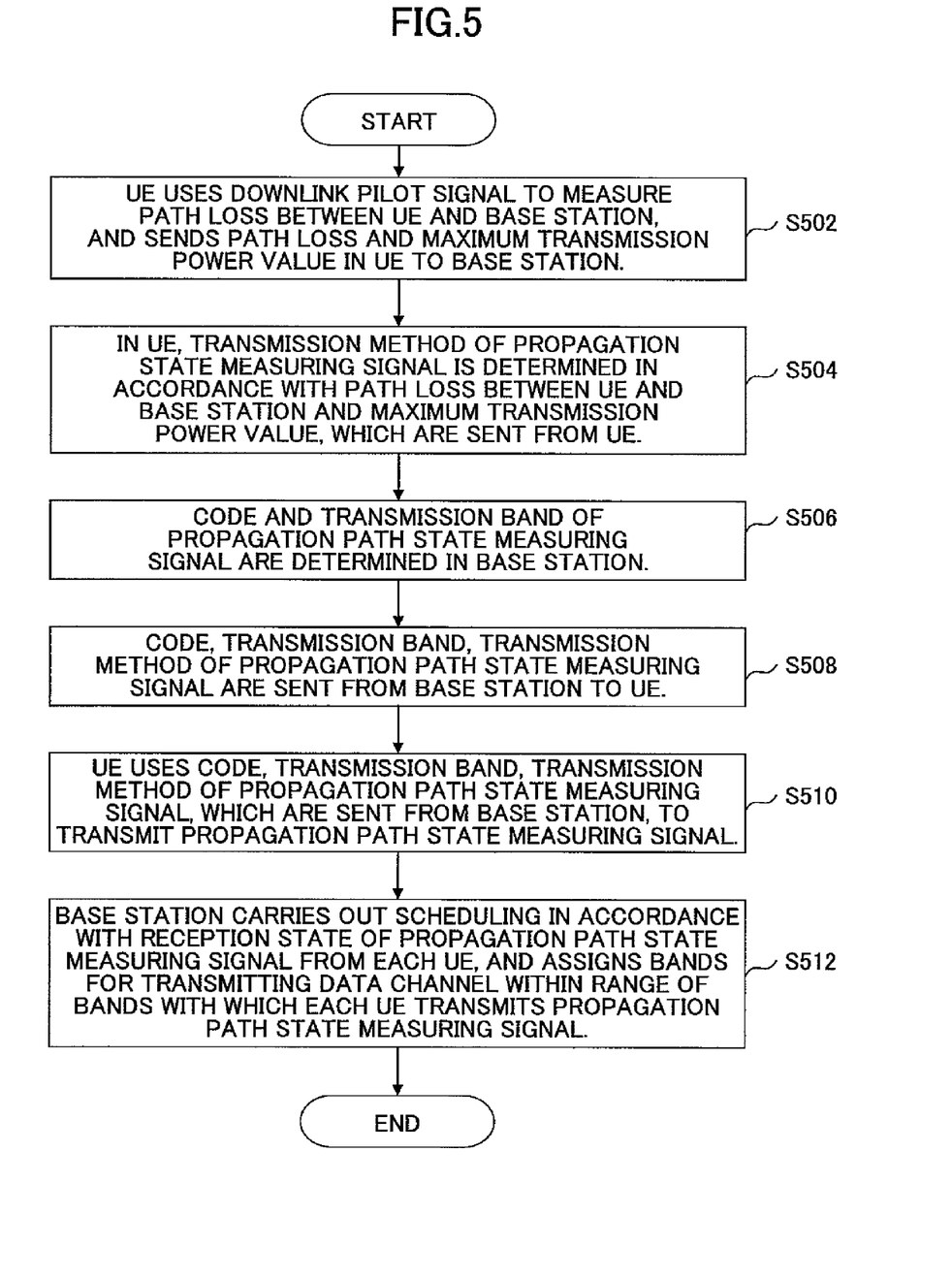
FIG. 5 is a flow diagram illustrating operations of a radio communications system according to an example of the present invention.

Next, operations of the radio communications system according to this example are explained in reference to FIG. 5.

The mobile station 200 measures a path loss between the mobile station 200 and the base station 100 by measuring the transmission power by use of a downlink pilot signal that is constantly transmitted by the base station 100, and provides the measured path loss along with the maximum transmission power of the mobile station with the base station 100 (step S502).

Next, the base station 100 determines the transmission method of the propagation path state measuring signal in accordance with the path loss and the maximum transmission power provided by the mobile station 200 (step S504).

Next, the base station 100 determines the code and the transmission band of the propagation path state measuring signal of the mobile station 200 (step S506). The base station 100 determines the code and the transmission band of the propagation path state measuring signal in a predetermined period. The base station 100 assigns the codes so that the mobile stations are orthogonal with one another along the frequency axis when the measuring signal is transmitted.

Next, the code, the transmission band, and the transmission method of the transmission state measuring signal are provided from the base station 100 to the mobile station 200 (step S508).

Next, the mobile station 200 uses the code, the transmission band, and the transmission method of the transmission state measuring signal that are provided from the base station 100 and transmits the propagation path state measuring signal (step S510).

Next, the base station 100 carries out scheduling in accordance with the reception state of the propagation path state measuring signal of each mobile station, and assigns the bands for use in transmitting a data channel within a range of the bands by which each mobile station transmits the propagation path state measuring signal (step S512).

According to this example, the propagation path state can be measured in a wide range (in the frequency domain) while assuring a high power density per band.

As a result, the data channel can be transmitted by the band with the better propagation path state by applying the frequency scheduling.

This international application claims the benefit of the priority date of Japanese. Patent Application No. 2006-077816 filed on Mar. 20, 2006, and the entire content of which application is incorporated herein by reference.

INDUSTRIAL APPLICABILITY

A base station, a mobile station, and a transmission control method of a propagation path measuring signal according to the present invention can be applied in a radio communications system.

The invention claimed is:

1. A base station comprising:
a transmission method determining portion that determines either of a multi-carrier method and a single carrier method, by which a mobile station is allowed to transmit a propagation path measuring signal; and
a transmission method sending portion that sends information indicating the determined transmission method to the mobile station,
wherein the propagation path measuring signal is an uplink signal transmitted from the mobile station to the base station in accordance with the determined transmission method and is measured by the base station to determine a propagation channel between the mobile station and the base station, and
wherein if the mobile station is near the base station, the transmission method determining portion determines that the mobile station uses the multi-carrier method to transmit the propagation path measuring signal, and otherwise, the transmission method determining portion determines that the mobile station uses the single-carrier method to transmit the propagation path measuring signal.

2. The base station of claim 1, wherein the transmission method determining portion determines either of the multi-carrier method and the single carrier method, by which the mobile station is allowed to transmit the propagation path measuring signal, in accordance with a maximum transmission power value and a path loss sent from the mobile station.

3. The base station of claim 2, wherein the transmission method determination portion estimates transmission power in accordance with the sent path loss so that a reception quality specified in advance is realized, and determines to allow the mobile station having a difference greater than or equal to a predetermined threshold value, the difference being between the maximum transmission power and the estimated transmission power, to transmit the propagation path measuring signal.

4. The base station of claim 1, further comprising a transmission band determination portion that assigns plural discontinuous frequency blocks among frequency blocks into which a system bandwidth is divided so that the frequency blocks are composed of continuous frequency sub-carriers when the transmission is determined to be made by the multi-carrier method, and assigns one or more of the frequency blocks continuous in a frequency domain when the transmission is determined to be made by the single carrier method.

5. The base station of claim 1, further comprising a transmission band determination portion that assigns plural discontinuous distribution type frequency blocks among distribution type frequency blocks composed of discretely distributed frequency sub-carriers in a system bandwidth when the transmission is determined to be made by the multi-carrier method, and assigns one or more continuous distribution type frequency blocks when the transmission is determined to be made by the single carrier method.

6. A mobile station comprising:
a data mapping portion that maps a signal sequence of a propagation path state measuring signal in sub-carriers in accordance with transmission information sent from a base station, the transmission information indicating that the propagation path state measuring signal is to be transmitted by either of a single carrier method and a multi-carrier method
wherein the propagation path state measuring signal is an uplink signal transmitted from the mobile station to the base station in accordance with the indicated method and is measured by the base station to determine a propagation channel between the mobile station and the base station, and
wherein if the mobile station is near the base station, the transmission information indicates that the mobile station uses the multi-carrier method to transmit the propagation path measuring signal, and otherwise, the transmission information indicates that the mobile station uses the single-carrier method to transmit the propagation path measuring signal.

7. The mobile station of claim 6, wherein the data mapping portion maps the signal sequence of the propagation path state measuring signal to plural discontinuous frequency blocks among frequency blocks obtained by dividing a system bandwidth into blocks of frequency sub-carriers when the transmission is determined to be made by the multi-carrier method, and maps the propagation path state measuring signal to frequency blocks that are continuous frequency carrier blocks into which the system bandwidth is divided when the transmission is determined to be made by the single carrier method.

8. The mobile station of claim 6, wherein the data mapping portion maps the signal sequence of the propagation path state measuring signal to plural discontinuous distribution type frequency blocks among distribution type frequency blocks composed of discretely distributed frequency sub-carriers in a system bandwidth when the transmission is determined to be made by the multi-carrier method, and maps the signal sequence of the propagation path state measuring signal to distribution type frequency blocks composed of frequency sub-carriers discretely distributed in the system bandwidth when the transmission is determined to be made by the single carrier method.

9. A transmission control method of a transmission path measuring signal, the method comprising:
- a transmission method determination step, wherein a base station determines either of a multi-carrier method and a single carrier method, by which a mobile station is allowed to transmit a transmission path measuring signal;
- a transmission method sending step, wherein the base station sends information indicating the determined transmission method to the mobile station;
- a data mapping step, wherein the base station maps a signal sequence of the transmission path measuring signal in sub-carriers in accordance with the information indicating one of the multi-carrier method and the single carrier method by which the mobile station transmits the transmission path measuring signal, the information having been sent from the base station; and
- a transmission path measuring signal transmission step, wherein the mobile station transmits the transmission path measuring signal,
- wherein the propagation path measuring signal is an uplink signal transmitted from the mobile station to the base station in accordance with the determined transmission method and is measured by the base station to determine a propagation channel between the mobile station and the base station, and
- wherein if the mobile station is near the base station, the transmission method determination step comprises determining that the mobile station uses the multi-carrier method to transmit the propagation path measuring signal, and otherwise, the transmission method determination step comprises determining that the mobile station uses the single-carrier method to transmit the propagation path measuring signal.

10. The transmission control method of the transmission path measuring signal according to claim 9, further comprising a step wherein the mobile station sends a path loss and a maximum transmission power value, wherein either of the multi-carrier method and the single carrier method by which the transmission path measuring signal is transmitted is determined in accordance with the path loss and the maximum transmission power value sent from the mobile station in the transmission method determination step.

11. The transmission control method of the transmission path measuring signal according to claim 9, wherein a transmission power is estimated so that a reception quality specified in advance is realized, and wherein the mobile station having a difference greater than or equal to a predetermined threshold value, the difference being between the maximum transmission power and the estimated transmission power, is determined to transmit the transmission path measuring signal by the multi-carrier method, in the transmission method determination step.

12. The transmission control method of the transmission path measuring signal according to claim 9, further comprising a transmission band determination step, wherein plural discontinuous frequency blocks among frequency blocks into which a system bandwidth is divided so that the frequency blocks are composed of continuous frequency sub-carriers are assigned when the transmission is determined to be made by the multi-carrier method, and one or more of the continuous frequency blocks are assigned when the transmission is determined to be made by the single carrier method.

13. The transmission control method of the transmission path measuring signal according to claim 9, plural discontinuous distribution type frequency blocks among distribution type frequency blocks composed of discretely distributed frequency sub-carriers in the system bandwidth are assigned when the transmission is determined to be made by the multi-carrier method, and one or more of the continuous distribution type frequency blocks when the transmission is determined to be made by the single carrier method.

* * * * *